United States Patent Office 3,646,171
Patented Feb. 29, 1972

3,646,171
BIS-[α-(THIO) PHOSPHORYL OXIMINO]-PHENYL-
ENE-1,4-BIS-ACETIC ACID NITRILES
Walter Lorenz, Wuppertal-Vohwinkel, Günter Unterstenhöfer, Opladen, and Ingebord Hammann, Cologne, Germany, assignors to Farbenfabriken Bayer Aktiengesellschaft, Leverkusen, Germany
No Drawing. Filed Feb. 23, 1968, Ser. No. 707,394
Claims priority, application Germany, Mar. 1, 1967, F 51,673
Int. Cl. A01n 9/36; C07f 9/06
U.S. Cl. 260—926
8 Claims

ABSTRACT OF THE DISCLOSURE

Bis-[α-(O-alkyl-O-alkyl - phosphoryl and -thinophosphoryl, and alkyl-O-alkyl-phosphonyl and -thionophosphonyl)-oximinol]-phenylene-1,4-bis - acetic acid nitriles which possess pesticidal, especially acaricidal and insecticidal, properties and which may be produced by reacting the corresponding phosphoric (phosphonic) and thiono-phosphoric (-phosphonic) acid ester halide with α, α-'dioximino-phenylene-1,4-bis-acetic acid nitrile.

---

The present invention relates to and has for its objects the provision for particular new phosphoric (-phosphonic) and thiono-phosphoric (-phosphonic) acid esters of α,α'-dioximino-phenylene-1,4-bis-acetic acid nitriles which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is already known that O,O-dialkyl-phosphoryl-oximines can be prepared by reaction of geminal halo-nitro- or -nitroso- -alkanes wtih O,O,O-trialkyl-phosphorous acid esters in the sense of the following equation (cf. J. F. Allen, J. Am. Chem. Soc., volume 79 (1957), page 3071):

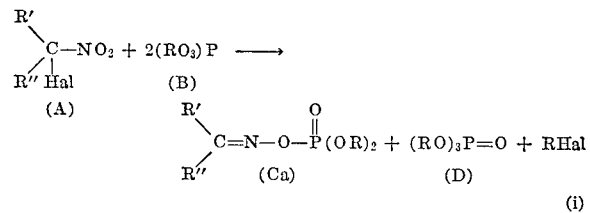

(i)

in which R, R' and R" are alkyl radicals and Hal is a halogen atom, e.g. chloro.

Furthermore, in a work by T. Mukaiyama and H. Nambu in J. Org. Chem. vol. 27 (1962), p. 2201, there is described the reaction of alkali metal salts of nitroalkanes which contain the nitro group on a secondary carbon atom with O,O-dialkyl-phosphorous acid ester chlorides to give O,O-dialkyl-phosphoryl-oximinoalkanes. The reaction proceeds according to the following equation:

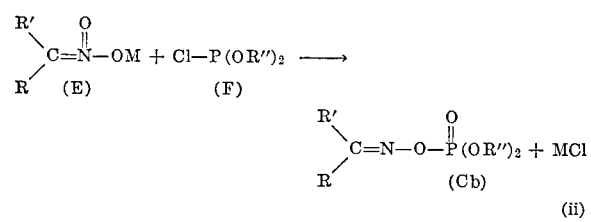

(ii)

in which R, R' and R" are alkyl radicals and M is an alkali metal atom.

Moreover, from German Pat. 1,052,981 there is known the reaction of O,O-dialkyl-phosphoric or -thionophosphoric acid ester halides with oximes, preferably ketoximes, such as acetone oxime, 4-chloroacetophenone oxime or cyclohexanone oxime in the form of their alkali metal salts or in the presence of halogen hydride binding agents; this reaction leads in the sense of the following equation to O,O-dialkyl-(thiono)-phosphoryl-oximes:

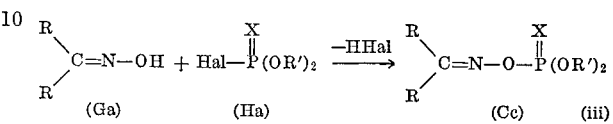

(iii)

in which R and R' are alkyl radicals, Hal is a halogen atom, e.g. chloro, and X is oxygen or sulfur.

Finally, according to the particulars given in German Patent 962,608 cyclic dicarboxylic acid hydroximides, in the form of their alkali metal salts or in the presence of acid-binding agents, such as the oximes of ketones, can be reacted with O,O-dialkyl-phosphoric or -thionophosphoric acid ester chlorides to give the corresponding N-(O,O-dialkyl-phosphoryl or -thionophosphoryl)-diacylimides, for example, thus:

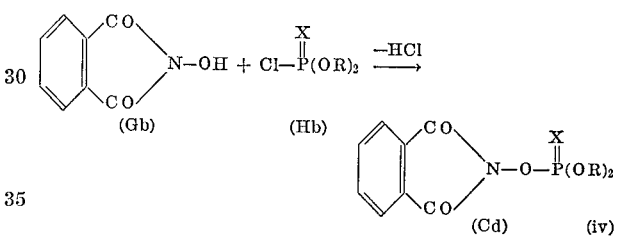

(iv)

in which R is an alkyl radical and X is oxygen or sulfur.

None of the methods of preparation known from the literature, however, leads to the instant bis-[α-(phosphoryl, phosphonyl, or thiono-phosphoryl or -phosphonyl)]-oximino-phenylene-1,4-bis-acetic acid nitriles having the Formula I noted below.

It has been found in accordance with the present invention that the particular new phosphoric (-phosphonic) and thiono-phosphoric (-phosphonic) acid esters of α,α'-dioximinophenylene-1,4-bis-acetic acid nitriles, i.e. bis-[α-(O-alkyl-O-alkyl-phosphoryl and -thionophosphoryl, and alkyl - O - alkyl - phosphonyl and -thionophosphonyl)-oximino]-phenylene-1,4-bis-acetic acid nitriles, having the formula

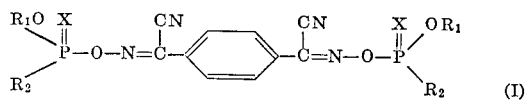

(I)

in which $R_1$ is alkyl having 1 to 4 carbon atoms, $R_2$ is selected from the group consisting of alkyl having 1 to 4 carbon atoms and alkoxy having 1 to 4 carbon atoms, and X is selected from the group consisting of oxygen and sulfur, exhibit strong pesticidal, especially insecticidal and acaricidal, properties.

It has been furthermore found in accordance with the present invention that a versatile and smooth process for the production of the particular new phopshoric, phosphonic and thiono-phosphoric and -phosphonic acid esters of α,α'-dioximinophenylene-1,4-bis-acetic acid nitriles of Formula I above in favorable yields may be provided, which comprises reacting the corresponding phosphoric, phosphonic or thionophosphoric (-phosphonic) acid ester halide having the formula

(IIa)

with α,α'-dioximino-phenylene-1,4-bis-acetic acid nitrile having the formula

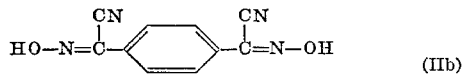

(IIb)

in the presence of an acid-binding agent or in the form of a salt.

The course of the process according to the present invention is illustrated by the following equation:

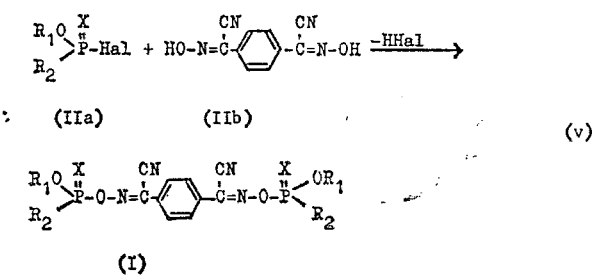

In the last-mentioned equation, the symbols $R_1$, $R_2$ and X are the same as defined above, while Hal represents a halogen atom such as chloro, bromo, iodo or fluoro, preferably chloro.

Surprisingly, the instant compound, in comparison with the active compounds (of anologous constitution and the same type of activity) known from the literature, are distinguished by a much better effectiveness with considerably lower toxicity to warm-blooded animals and with concomitantly low phytotoxicity. The instant compounds therefore represent a genuine enrichment of the art.

The α,α'-dioximino-phenylene-1,4-bis-acetic acid nitrile used as starting material has not yet been described in the literature but can be prepared according to known methods from 1,4-benzodihydroxamic acid chloride and sodium cyanide in aqueous alcoholic solution.

The reaction according to the present invention is carried out preferably in the presence of an inert solvent (which includes a mere diluent). Good results have been obtained particularly with low-boiling aliphatic ketones and nitriles, such as acetone, methylethyl ketone, methylisopropyl ketone, methylisobutyl ketone, acetonitrile and propionitrile, and also with (optionally chlorinated) aromatic or aliphatic hydrocarbons, for example benzene, toluene, xylene, chlorobenzene, methylene chloride, chloroform, carbon tetrachloride, and mono-, di- and trichloroethylene. Finally, insofar as the reactiveness of the (thiono)phosphoric (-phosphonic) acid ester halides concerned allows, the reaction can also take place in water as solvent.

Furthermore, the process of the present invention can, as already mentioned above, also be carried out with the use of acid-binding agents. As acid acceptors, particularly suitable are alkali metal carbonates and alcoholates, such as potassium or sodium carbonate and methylate or ethylate, but also tertiary bases, for example triethylamine, diethylaniline or pyridine. Instead of working in the presence of acid-binding agents, it is also possible to use a salt of α,α'-dioximino-phenylene-1,4-bis-acetic acid nitrile.

For this purpose there are suitable, above all, alkali metal salts and salts of alkaline earth metals and of heavy metals (for example of silver).

The carrying out of the process of the present invention is possible within a fairly wide temperature range. In general, the work is carried out at room temperature or at slightly to moderately elevated temperature and preferably at 20 to 40° C. Since, however, the reaction sometimes proceeds more or less strongly exothermically it is necessary in these cases, particularly at the beginning of the reaction, to cool the mixture externally. Finally, it has proved expedient to continue stirring of the mixture (after mixing the reactants) for a longer period (½ to 3 hours or overnight—optionally with slight heating) in order to complete the reaction.

The products of the instant process are in most cases colorless to slightly yellow-colored water-insoluble oils which, even under greatly reduced pressure, can be distilled in only small quantities since they are sensitive to elevated temperature lasting for a longer period; some of the new substances are obtained in the form of colorless or yellow-colored crystalline compounds, which can readily be further purified by recrystallization from the usual solvents or mixtures of solvents.

The particular new (thiono)-phosphoric (-phosphonic) acid esters which can be prepared according to the instant process possess an outstanding, rapidly commencing biocidal, in particular insecticidal and acaricidal, effectiveness, with extremely low toxicity to warm-blooded animals. The instant products are therefore usable with success in plant protection for the control of noxious sucking and biting insects, Diptera and mites (Acari).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicades, such as *Euscelis bilobatus* and *Nephotettix bipunctatus;* and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*),the Mediterranean flour moth (*Ephestia Kuhniella*) and greater wax moth (*Galleria mellonella*); and the like. Also to be classed with the biting insects contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Gryllus domesticus*); termiites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite ((*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01–5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g. surface-active agent, such as an emulsifying agent and/or a dispersing agent, and an amount of the active compound which is effective for the purpose in question and which is generally between about 0.00001 and 95%, and preferably 0.01–95%, by weight of the mixture.

In particular, the present invention contemplates methods of selectively controlling or combating pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to be protected, a correspondingly combative amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

Phaedon larvae test

Solvent: 3 parts by weight of acetone
Emulsifier: 1 part by weight of alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the specified period of time, the degree of destruction of the pests is determined and expressed as a percentage 100% means that all, and 0% means that none, of the beetle larvae are killed.

The particular active compounds tested, their concentrations, the evaluation time and the results obtained can be seen from the following Table 1:

After the specified period of time, the effectiveness of the given preparation of active compound is determined by counting the dead mites. The degree of destruction

TABLE 1

| Active compound | | Concentration of active compound in percent | Degree of destruction in percent after 3 days |
|---|---|---|---|
| (C) | 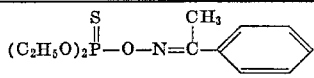 (known) | 0.1<br>0.01 | 20<br>0 |
| (III$_1$) | 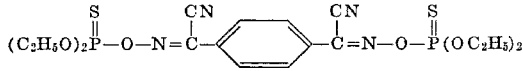 | 0.1<br>0.01 | 100<br>100 |
| (IV$_1$) | 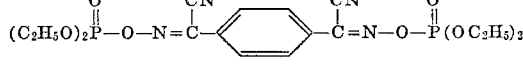 | 0.1<br>0.01<br>0.001 | 100<br>100<br>80 |
| (V$_1$) | 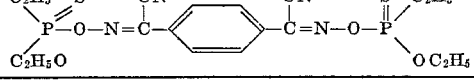 | 0.1<br>0.01 | 100<br>60 |

EXAMPLE 2

Tetranychus test

Solvent: 3 parts by weight of acetone
Emulsifier: 1 part by weight of alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

thus obtained is expressed as a percentage: 100% means that all the spider mites are killed whereas 0% means that none of the spider mites are killed.

The particular active compounds tested, their concentrations, the evaluation time and the results obtained can be seen from the following Table 2:

TABLE 2

| Active compound | | Concentration of active compound in percent | Degree of destruction in percent after 48 hours |
|---|---|---|---|
| (C) | 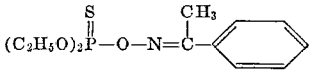 (known) | 0.1<br>0.01 | 50<br>0 |
| (III$_2$) | 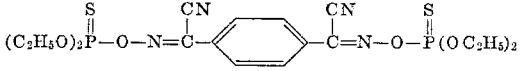 | 0.1<br>0.01 | 100<br>100 |
| (V$_2$) | 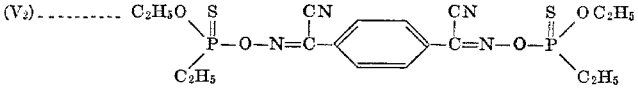 | 0.1<br>0.01 | 100<br>20 |

EXAMPLE 3

Plutella test

Solvent: 3 parts by weight of acetone
Emulsifier: 1 part by weight of alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 3:

TABLE 3

| Active compound | | Concentration of active compound in percent | Degree of destruction in percent after 3 days |
|---|---|---|---|
| (C) | $(C_2H_5O)_2\overset{S}{\overset{\|}{P}}-O-N=\overset{CH_3}{\overset{\|}{C}}-\langle\text{phenyl}\rangle$ (known) | 0.1<br>0.01 | 100<br>0 |
| (VI$_1$) | $(CH_3O)_2\overset{S}{\overset{\|}{P}}-O-N=\overset{CN}{\overset{\|}{C}}-\langle\text{phenylene}\rangle-\overset{CN}{\overset{\|}{C}}=N-O-\overset{S}{\overset{\|}{P}}(OCH_3)_2$ | 0.1<br>0.01<br>0.001 | 100<br>100<br>70 |
| (III$_3$) | $(C_2H_5O)_2\overset{S}{\overset{\|}{P}}-O-N=\overset{CN}{\overset{\|}{C}}-\langle\text{phenylene}\rangle-\overset{CN}{\overset{\|}{C}}=N-O-\overset{S}{\overset{\|}{P}}(OC_2H_5)_2$ | 0.1<br>0.01<br>0.001 | 100<br>100<br>95 |
| (IV$_2$) | $(C_2H_5O)_2\overset{O}{\overset{\|}{P}}-O-N=\overset{CN}{\overset{\|}{C}}-\langle\text{phenylene}\rangle-\overset{CN}{\overset{\|}{C}}=N-O-\overset{O}{\overset{\|}{P}}(OC_2H_5)_2$ | 0.1<br>0.01<br>0.001 | 100<br>100<br>100 |
| (V$_3$) | $\begin{array}{c}C_2H_5\\ \diagdown\\ C_2H_5O\end{array}\overset{S}{\overset{\|}{P}}-O-N=\overset{CN}{\overset{\|}{C}}-\langle\text{phenylene}\rangle-\overset{CN}{\overset{\|}{C}}=N-O-\overset{S}{\overset{\|}{P}}\begin{array}{c}C_2H_5\\ \diagup\\ OC_2H_5\end{array}$ | 0.1<br>0.01 | 100<br>100 |

The following further examples in accordance with the present invention illustrate without limitation the process for producing the instant compounds:

EXAMPLE 4

(III$_4$) 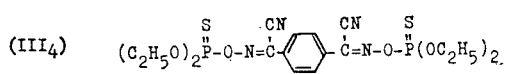

77 g. (0.36 mol) of α,α'-dioximino-phenylene-1,4-bis-acetic acid nitrile are dissolved in 300 ml. of acetone. After addition of 77 g. (0.72 mol) of 95% triethylamine, there are added dropwise to the reaction mixture, with external cooling, 113 g. (0.6 mol) of O,O-diethyl-thionophosphoric acid ester chloride; the reaction mixture is stirred for a further hour and then poured into water. The precipitated crystalline product is filtered off with suction and washed with water. By recrystallization from a mixture of equal parts of ether and petroleum ether (solubility 1 g./10 cc.), bis-[α-(O,O-diethylthionophosphoryl)-oximino]-phenylene-1,4-bis-acetic acid nitrile is obtained in the form of golden-yellow flakes of melting point 78° C. The yield is 150 g. (96.3% of the theory).

Analysis.—Calculated for a molecular weight 518.5 (percent): N, 10.80; S, 12.37; P, 11.95. Found (percent): N, 10.72; S, 12.14; P, 11.81.

The α,α'-dioximino-phenylene-1,4-bis-acetic acid nitrile can be prepared for example as follows:

A solution of 117 g. (0.5 mol) of 1,4-benzodihydroxamic acid chloride (prepared according to Miley and Wakefield, "Journal of Organic Chemistry," vol. 25 (1960), p. 550, see also H. Rheinboldt, "Liebigs Annalen der Chemie," vol. 451, p. 109 (1926)) in methanol is added dropwise at 30 to 40° C., with cooling to a solution of 98 g. (2 mols) of sodium cyanide in 500 ml. of water. After the mixture has been stirred for half an hour, the precipitate is filtered off with suction and washed with water. The filtration residue is suspended in water, mineral acid is added to it until there is an acidic reaction on Congo paper and the crystalline product is then dissolved in ether.

The insoluble impurities are filtered off with suction, the filtrate is dried and the solvent is distilled off. The crude α,α'-dioximino-phenylene-1,4-bis-acetic acid nitrile is recrystallized from acetonitrile (1 g./15 cc.); it is obtained in pure form as pale yellow crystal powder of melting point 227 to 229° C. (with decomposition).

The yield is 53 g. (49.6% of the theory).

EXAMPLE 5

(III$_5$) 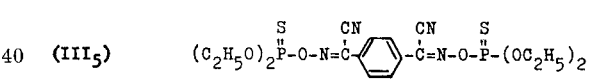

After portionwise addition of 400 g. (3.6 mols) of ground potassium carbonate to a solution of 320 g. (0.5 mol) of α,α'-dioximino-phenylene-1,4-bis-acetic acid nitrile in 1500 ml. of acetone and 500 ml. of dimethyl formamide, the solution is stirred at room temperature for ½ to 1 hour. There are then added to the reaction mixture, dropwise at not more than 30° C. with external cooling with ice water, 560 g. (3 mols) of O,O-diethyl-thionophosphoric acid ester chloride. The reaction mixture is stirred for a further hour at room temperature and then poured into water; the bis-[α-(O,O-diethyl-thionophosphoryl)-oximino]-phenylene-1,4 - acetic acid nitrile slowly solidifies in crystalline form. After the crystal mass has been filtered off with suction, the product is washed first with water and then with a little methanol. The yield is 485 g. (62.4% of the theory). The melting point is 76 to 77° C.

EXAMPLE 6

(IV$_3$) 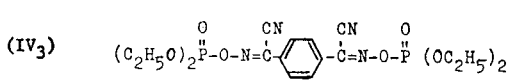

77 g. (0.36 mol) of α,α'-dioximino-phenylene-1,4-bis-acetic acid nitrile (M.P. 227 to 229° C. with decomposition) are dissolved in 300 ml. of acetone; after addition of 77 g. (85 cc.=0.72 mol) of 95% triethylamine, there are added dropwise to the reaction mixture, with occasional external cooling, 103 g. (0.6 mol) of O,O-diethyl-phosphoric acid ester chloride and the reaction mixture is then stirred for a further hour and finally poured into water. The separated oil is taken up in ether and the ethereal solution is washed several times with water, then with dilute hydrochloric acid, then again with water, and dried over sodium sulfate. After the solvent has been distilled off, there remain behind 47 g. (32.3% of the theory) of bis-[α-(O,O-diethyl-phosphoryl)-oximino]-phenylene-1,4-bis-acetic acid nitrile in the form of an oil which rapidly solidifies in crystalline form. By recrystallization from a benzene/ether mixture (1:4) the product is obtained in fine yellow needles of melting point 100 to 101° C.

*Analysis.*—Calculated for a molecular weight of 486.4 (percent): N, 11.52; P, 12.74. Found (percent): N, 11.69; P, 12.84.

EXAMPLE 7

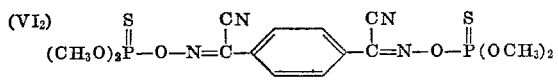

64 g. (0.3 mol) of α,α'-dioximino-phenylene-1,4-bis-acetic acid nitrile are dissolved in 300 ml. of acetone. After addition of 99 g. (0.72 mol) of ground potassium carbonate, this solution is stirred for half an hour at room temperature; 97 g. (0.6 mol) of O,O-dimethyl-thionophosphoric acid ester chloride are then added dropwise at 20 to 30° C, with cooling, to the reaction mixture and the latter is stirred for a further hour in order to complete the reaction and is then poured into water The precipitated crystalline product is filtered off with suction and washed with water and methanol. The bis - [α - (O,O-dimethyl-thionophosphoryl)-oximino]-phenylene-1,4-bis-acetic acid nitrile is obtained pure, by recrystallization from isopropyl alcohol (1 g./15 ml.) in golden-yellow needles of melting point 117 to 119° C. The yield is 84 g. (71.3% of the theory).

*Analysis.*—Calculated for a molecular weight of 462.4 (percent): N, 12.12; S, 13.87; P, 12.40. Found (percent): N, 12.08; S, 13.90; P, 13.36.

EXAMPLE 8

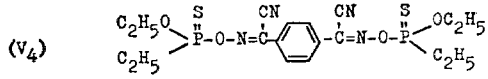

To a solution of 64 g. (0.3 mol) of α,α'-dioximino-phenylene-1,4-bis-acetic acid nitrile in 300 ml. of acetone are added 99 g. (0.73 mol) of ground potassium carbonate; the mixture is subsequently stirred for a further hour and there are added to it dropwise at 20 to 30° C., with occasional cooling, 103 g. (0.6 mol) of ethyl-O-ethyl-thionophosphonic acid ester chloride. After one hour of stirring, the reaction mixture is poured into water and worked up in the manner described in the preceding examples 78 g. (53.4% of the theory) of bis-[α-(ethyl-O-ethylthionophosphonyl)-oximino]-phenylene - 1,4 - bis-acetic acid nitrile are obtained. The compound crystallizes from isopropyl alcohol in pale yellow needles of melting point 109 to 111° C.

*Analysis.*—Calculated for a molecular weight of 486.4 (percent): N, 11.52; S, 13.19; P, 12.74. Found (percent): N, 11.39; S, 12.92; P, 12.49.

Advantageously, in accordance with the present invention, in the foregoing formulae:

$R_1$ represents straight and branched chain alkyl having 1 to 4 carbon atoms such as methyl, ethyl, n-propyl, isopropyl, n-butyl, isobutyl, sec.-butyl, tert.-butyl, and the like, especially methyl, ethyl, n- and iso-propyl, n-, iso- and s-butyl, and the like;

$R_2$ represents straight and branched chain alkyl having 1 to 4 carbon atoms as defined above for $R_1$; or straight and branched chain alkoxy having 1 to 4 carbon atoms such as methoxy, ethoxy, n-propoxy, isopropoxy, n-butoxy, isobutoxy, sec.-butoxy, tert.-butoxy, and the like, especially methoxy, ethoxy, n- and iso-propoxy, and even n-, iso- and s-butoxy, and the like; and X represents oxygen or sulfur.

Preferably, $R_1$ and $R_2$ are the same $C_{1-4}$ alkyl radical, or $R_2$ is $C_{1-4}$ alkoxy having the same corresponding alkyl radical therein as in $R_1$, i.e. with the same number of carbon atoms, $R_1$ and $R_2$ most preferably being straight chain radicals; and X is oxygen or sulfur, most preferably sulfur. In particular, $R_1$ is methyl or ethyl; $R_2$ is methyl, ethyl, methoxy or ethoxy; and X is oxygen or sulfur, especially sulfur.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus-acid ester of α,α'-dioximino-phenylene-1,4-bis-acetic acid nitrile having the formula

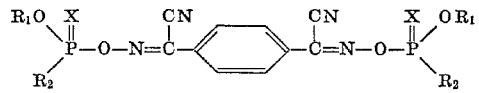

in which $R_1$ is alkyl having 1 to 4 carbon atoms, $R_2$ is selected from the group consisting of alkyl having 1 to 4 carbon atoms and alkoxy having 1 to 4 carbon atoms, and X is selected from the group consisting of oxygen and sulfur.

2. Ester according to claim 1 wherein $R_1$ and $R_2$ are $C_{1-4}$ alkyl; and X is selected from the group consisting of oxygen and sulfur.

3. Ester according to claim 1 wherein $R_1$ is $C_{1-4}$ alkyl and $R_2$ is $C_{1-4}$ alkoxy; and X is selected from the group consisting of oxygen and sulfur.

4. Ester according to claim 1 wherein $R_1$ and $R_2$ are straight chain radicals having the same number of carbon atoms; and X is selected from the group consisting of oxygen and sulfur.

5. Ester according to claim 1 wherein such compound is bis-[α-(O,O-diethyl-thionophosphoryl)-oximino]-phenylene-1,4-bis-acetic acid nitrile having the formula

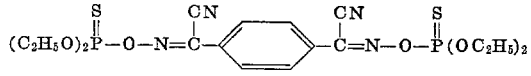

6. Ester according to claim 1 wherein such compound is bis-[α-(O,O-diethyl-phosphoryl)-oximino] - phenylene-1,4-bis-acetic acetic acid nitrile having the formula

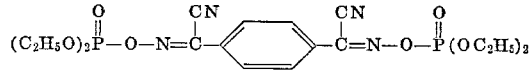

7. Ester according to claim 1 wherein such compound is bis-[α-(ethyl - O - ethyl-thionophosphonyl)-oximino]-phenylene-1,4-bis-acetic acid nitrile having the formula

8. Ester according to claim 1 wherein such compound is bis - [α - (O,O-dimethyl-thionophosphoryl)-oximino]-phenylene-1,4-bis-acetic acid nitrile having the formula
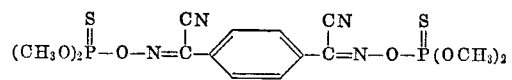
No references cited.
CHARLES B. PARKER, Primary Examiner
A. H. SUTTO, Assistant Examiner
U.S. Cl. X.R.
260—928, 968, 969; 424—204